March 24, 1964

W. W. HILL 3,126,210

TRAILER HITCH

Filed Aug. 14, 1961

WAYLAND W. HILL
INVENTOR

HUEBNER & WORREL
ATTORNEYS

BY *Richard M. Worrel*

United States Patent Office 3,126,210
Patented Mar. 24, 1964

3,126,210
TRAILER HITCH
Wayland W. Hill, P.O. Box 168, Earlimart, Calif.
Filed Aug. 14, 1961, Ser. No. 131,219
4 Claims. (Cl. 280—478)

This invention relates to a vehicle drawbar assembly for connecting a draft vehicle and a trailing vehicle and more particularly to such a drawbar assembly providing transverse and longitudinal adjustment to facilitate such connection wherein the drawbar is releasably locked in a towing position limiting further displacement in either direction by a single automatically engageable locking device.

It is common practice in drawbars for connecting a trailing vehicle to a tractor, truck, or other draft vehicle, to provide a degree of adjustability in the connection so that the vehicles need not necessarily be in exact alignment while the connection is being made. Longitudinal adjustment is also desirable from a safety standpoint to enable the connection to be made with the vehicles in proximity without requiring precise relative positioning of the vehicles as the connection is completed.

A problem which occurs in this regard in conventional drawbar assemblies is that the connecting drawbar is encumbered with a multiplicity of latches and/or locks which tend to hinder connection of the vehicles and add considerable weight to the drawbar and increase its cost. Also, such conventional devices, providing both transverse and longitudinal adjustment, require manual actuation of the locking devices associated therewith which necessitates that the operator dismount from the vehicle to complete the connection. Other known devices provide remote controls operable from the operators station on the vehicle which employ complicated and undependable linkages or cables. Furthermore, such drawbars are not adequately sealed to preclude the entry of dirt or to maintain a supply of lubricant therein for smooth drawbar operation.

It is therefore an object of the present invention to provide a vehicle drawbar assembly for simply and easily connecting and disconnecting a draft vehicle and a trailing vehicle.

Another object of the present invention is to provide a vehicle drawbar assembly which is transversely and longitudinally adjustable to facilitate connection with a vehicle to be towed.

Another object is to provide a vehicle drawbar assembly which is automatically releasably locked in the desired towing position after an initial connection is made.

Another object is to provide an adjustable vehicle drawbar assembly which is releasably locked in towing position against transverse and longitudinal displacement by a single locking device.

Another object is to provide an adjustable drawbar assembly which is enclosed to preclude the entry of dirt and which is readily lubricated for smooth, trouble free operation.

Other objects and advantages of the present invention will become more fully apparent in the subsequent description in the specification.

Figure 1:
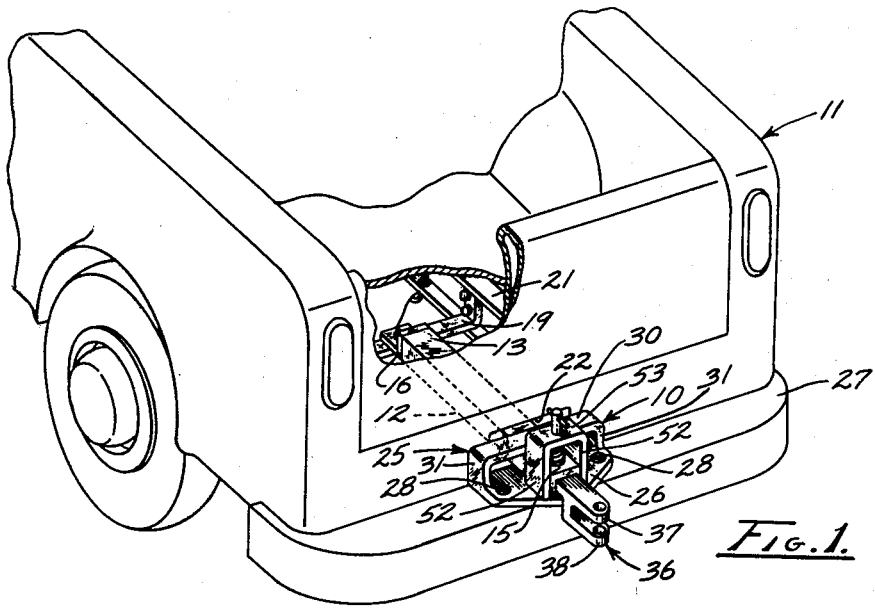
FIG. 1 is a perspective view of a drawbar assembly embodying the principles of the present invention shown mounted to the rear of a pickup truck which is fragmentarily represented.

Referring in greater particular to the drawing, a drawbar assembly embodying the principles of the present invention is indicated generally at 10. As shown in FIG. 1 the drawbar assembly is mounted on the rear end of a pickup truck 11. It is noted that while the drawbar assembly is shown mounted on such a vehicle, it can be mounted on numerous other types of draft vehicles such as tractors, passenger automobiles, and the like.

The drawbar assembly 10 includes an elongated substantially rectangular hollow outer sleeve member 12 having a forward end 13 and a rearward end 15. An angle strap member 16 is rigidly secured, as by welding, in closing relation to the forward end of the outer sleeve to form a forward extension 18. The extension 18 is pivotally mounted on a transverse mounting bar 19 by a vertically disposed pivot bolt 20. The bar is connected by suitable bolts between the usual truck frame members, one of which is shown at 21 in FIG. 1. It should be noted that the mounting bar 19 is of any suitable shape to fit the particular type of vehicle to which the drawbar assembly is applied.

Figure 3:
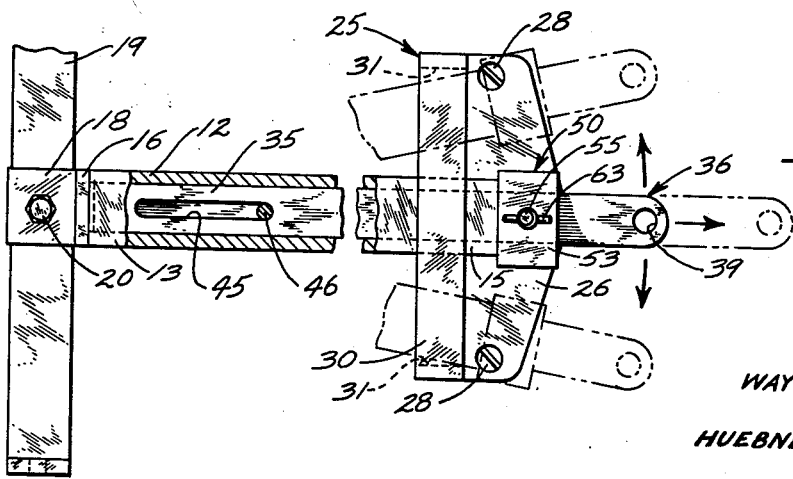
FIG. 3 is a top plan view of the drawbar assembly showing its alternate adjusted positions in phantom lines.

The rearward end 15 of the outer sleeve 12 extends longitudinally rearwardly of the truck 11 through an opening 22 in the rear panel of the truck bed. A transverse locking bracket 25, rearwardly adjacent to the opening, includes a lower plate 26 rigidly secured to a bumper 27 of the truck by a pair of recessed bolts 28. An upper strap member 30 is vertically upwardly spaced from the lower plate 26 which are interconnected by a pair of opposite vertical upstanding side bars 31. This construction is formed in any suitable manner, as by casting a fabrication. The rearward end 15 of the outer sleeve is extended through the elongated opening formed between the upper strap and the lower plate of the locking bracket and is transversely swingable in a horizontal plane about the forward pivot bolt 20. Such transverse movement is, however, limited by the side bars 31 of the bracket, as shown in FIG. 3.

Figure 2:
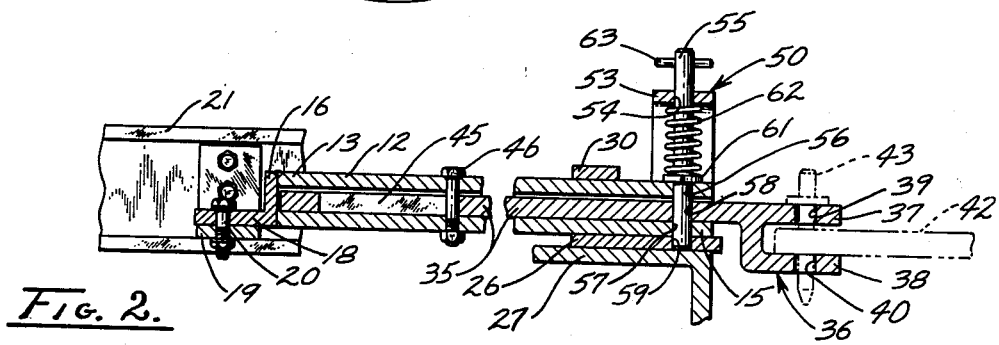
FIG. 2 is a longitudinal vertical section through the drawbar assembly of FIG. 1 with portions removed for illustrative convenience.

An elongated substantially rectangular drawbar is slidably received within the outer sleeve 12. The drawbar thereby closes the rearward end 15 of the outer sleeve limiting the entry of dirt and permitting retention of lubricant within the sleeve. The drawbar 35 includes a forked or bifurcated end 36 having a pair of vertically spaced plates 37 and 38 which provide aligned vertical apertures or bores 39 and 40. The outer end 36 of the drawbar thereby provides connection for a trailing vehicle by inserting the usual tongue member of such a vehicle between the tines, as shown by the phantom lines at 42 in FIG. 2. A suitable pin 43, similarly shown, is inserted through the apertures 39 and 40 in the end of the drawbar and through an aligned aperture in the tongue to complete the connection.

The portion of the drawbar within the outer sleeve 12 provides an elongated, longitudinally extended slot 45 having closed ends. A threaded bolt member 46 is extended through the outer sleeve 12 and through the slot 45 in the drawbar. So disposed, the bolt is adapted to abut the drawbar at the ends of the slot and limit longitudinal movement of the drawbar with respect to the outer sleeve.

A drawbar locking device 50 employs a U-shaped strap member having a pair of downwardly extended legs 52 rigidly connected to the rearward end 15 of the outer sleeve. An upper plate 53 interconects the legs and provides a vertically disposed aperture 54 located centrally therein. A vertically slidable pin 55 is disposed within the aperture 54 to extend downwardly through a plurality of aligned apertures 56 and 57 in the outer sleeve, an aperture 58 in the drawbar and an aperture 59 in the lower plate 26 of the locking bracket 25. When aligned as in FIG. 2, downward movement of the pin 55 is limited by a flange member 61 pinned or otherwise rigidly mounted on the locking pin 55. The flange also functions to retain a compression spring 62 in position about the pin 55 between the flange 61 and the upper plate 52 of the locking device. A transverse horizontal pin 63 is rigidly mounted diametrically of the upper end of the pin 55 to provide grasping means by which the pin can be manually actuated upwardly against the force of the spring 62 and outwardly of the apertures 57, 58 and 59.

*Operation*

The operation of the described embodiment of the present invention is believed to be clearly apparent and is briefly summarized at this point. When it is desired to connect a trailing vehicle or any other object to be towed having a suitable tongue, with a draft vehicle, such as that shown in FIG. 1, having the drawbar assembly of the present invention mounted thereon, the pin 55 is raised in the locking device 50 to permit longitudinal movement of the draw bar within the sleeve and transverse horizontal swinging movement of the outer sleeve within the transverse locking bracket 25. The draft vehicle is then positioned forwardly of the trailing vehicle to be connected and in proximity thereto. Such positioning is not critical in that the outer sleeve can be manipulated to any point between its outer position, as shown in the phantom lines of FIG. 3 and its inner position, shown in full lines. The drawbar 35 is longitudinally rearwardly extendible from the outer sleeve until the forward end of the slot 45 abuts the stop bolt 46. Such extension is desirable to provide additional clearance between the vehicles to furnish sufficient space for the operator safely and conveniently to stand while making the connection.

The tongue 42 of the trailing vehicle is then connected by the pin 43 to the drawbar which concludes any manual manipulation required by the operator in completing the connection. The remaining operations necessary rigidly to secure the drawbar in a towing position are completely automatic. In such operation, the draft vehicle is backed slowly towards the trailing vehicle to slide the drawbar forwardly within the outer sleeve 12 to the position shown in FIGS. 2 and 3 wherein the rearward end of the slot 45 abuts the stop bolt 46 and the aperture 58 within the drawbar is aligned with the pin 55. During said sliding movement of the drawbar the pin 55 slidably engages the upper surface of the drawbar and upon alignment, the spring 62 automatically thrusts the pin downwardly through the aligned apertures 58 and 59 in the drawbar and the outer sleeve, respectively. If at such time the drawbar 35 is misaligned with the truck 10, the lower end of the pin 55 is slidably rested on the upper surface of the lower plate 26 of the locking bracket. The truck 11 is then motivated in a forward direction. This aligns the outer sleeve 12 and the drawbar with the vehicle, and the pin 55 is automatically projected into the aperture 59 in the lower plate 26. With the pin so locked, the connection is better able to withstand the shearing forces accompanying such connections. In this arrangement, the shearing forces are absorbed through the drawbar and the outer sleeve member which are connected to the truck 11 at a pair of spaced points by the pin 55 and the pivot bolt 20. These then prevent relative shifting of the drawbar from its connection with the truck incident to the usual relative lunging movements encountered in conventional connections when starting, stopping, accelerating and the like.

The present invention has further advantage when disconnecting the trailing vehicle. Frequently the pin connecting the drawing and trailing vehicles becomes wedged and is difficult to remove. In conventional drawbars the pin is usually freed by further manipulation of the draft vehicle or manually maneuvering the trailing vehicle. With the present invention, however, loosening of the pin 43 is easily accomplished by merely pulling the pin 55 upwardly out of the aligned apertures which permits the drawbar 35 to seek its own position within the outer sleeve 12 and thereby free the connecting pin 43 so it can be easily withdrawn.

From the foregoing, it is readily apparent that the single locking pin 55 of the present invention dependably and selectively prohibits both longitudinal displacement between the drawbar and the outer sleeve member and horizontal transverse swinging movement of the outer sleeve. This is automatically accomplished after the connection has been simply and easily made and the trailing vehicle is being towed. Furthermore, the present invention is readily adaptable to various types of draft vehicles for providing simple, dependable, adjustable connection between the draft vehicles and trailing vehicles releasably connected thereto.

Although the invention has been herein shown and described in what is conceived to be the most practical and preferred embodiment, it is recognized that departures may be made therefrom within the scope of the invention, which is not limited to the details disclosed herein but is to be accorded the full scope of the claims so as to embrace any and all equivalent devices and apparatus.

Having described my invention, what I claim as new and desire to secure by Letters Patent is:

1. A vehicle drawbar assembly for connecting draft and trailing vehicles comprising an elongated rectangular outer sleeve member having opposite ends; means pivotally mounting one end of the sleeve member on the draft vehicle for transverse horizontal swinging movement of the opposite end of said sleeve member; a bracket fixedly mounted on the draft vehicle in rearwardly spaced relation to the mounting means supporting said opposite end of the outer sleeve member for the transverse swinging movement; an elongate drawbar longitudinally slidable in said outer sleeve member providing means for connection to the trailing vehicle; said sleeve, said bracket and said drawbar having alignable locking bores; and pin means mounted on said outer sleeve member releasably engageable with said bracket and said drawbar in the respective locking bores thereof for locking the drawbar in the outer sleeve member and locking said sleeve member in predetermined position on the bracket.

2. A vehicle drawbar for connection between draft and trailing vehicles comprising an elongated rectangular outer sleeve member having opposite ends, one end being pivotally mounted on the draft vehicle for transverse horizontal swinging movement of the opposite end thereof; a bracket mounted on the draft vehicle defining an elongated transverse opening through which said opposite end of the outer sleeve member is adapted to extend to limit said transverse swinging movement, said bracket providing a vertical bore centrally disposed therein, said outer sleeve member providing aligned vertical bores therein adjacent to said opposite end; an elongated drawbar longitudinally slidably mounted in said outer sleeve member, said drawbar having a vertical bore therein alignable with said bores in the outer sleeve member; a substantially U-shaped member mounted on and extended upwardly from said opposite end of the outer sleeve member; and a lock pin vertically slidably mounted in said U-shaped member, said pin being urged downwardly through said aligned bores in the outer sleeve member and the drawbar for sliding movement against said bracket during said swinging movement of the outer sleeve member, and said pin being automatically engageable in said bores, in the bracket when the outer sleeve member is disposed centrally of the bracket whereby the outer sleeve member and the drawbar are releasably connected to the bracket.

3. A vehicle drawbar for connection between draft and trailing vehicles comprising an elongated rectangular outer sleeve member having opposite ends, one of said ends being closed by an angle strap pivotally mounting said outer sleeve member on the draft vehicle for transverse horizontal swinging movement of the opposite end thereof; an elongated drawbar having an outer end adapted for connection to the trailing vehicle slidably mounted in said opposite end of the sleeve member; a bracket mounted on the draft vehicle defining an elongated transverse opening through which said opposite end of the outer sleeve member extends whereby the bracket limits said transverse swinging movement, said bracket providing therein a centrally disposed vertical bore, said outer sleeve member providing therein aligned vertical bores adjacent to said open end, said drawbar having therein a vertically disposed bore adjacent to said outer end, said drawbar having an elongated longitudinally disposed slot having opposite ends spaced from opposite ends of the drawbar; a bolt mounted intermediate the ends of the outer sleeve member and extended through said slot in the drawbar for limiting longitudinally sliding of the drawbar within the outer sleeve member, said bolt abutting the end of the slot nearest said bore in the drawbar whereby said bore is aligned with the bores in the outer sleeve member; a substantially U-shaped member mounted on said outer sleeve member and extended upwardly therefrom in adjacent straddling relation to said bores in the outer sleeve member; a lock pin vertically slidably mounted in said U-shaped member in alignment with said bores in the outer sleeve box member; and resilient means mounted in the U-shaped member urging the pin downwardly through said bores in the outer sleeve member in sliding engagement with said drawbar, said pin being automatically engageable in said bore in the drawbar when the end of the slot therein nearest the bore abuts said bolt in the outer sleeve member, and said pin slidably engaging said bracket during said swinging movement of the outer sleeve member whereby the pin is automatically engageable in said bore in the bracket when the outer sleeve member is disposed centrally of the bracket.

4. A vehicle drawbar assembly for connection between draft and trailing vehicles comprising an elongated outer sleeve member having opposite ends; means pivotally mounting one end of the sleeve on the draft vehicle; mounting means rigidly secured to the vehicle and supporting the opposite end of the sleeve for transverse horizontal swinging movement throughout a predetermined range; an elongated drawbar longitudinally slidably received within the sleeve and having one end projecting from said opposite end of the outer sleeve member; means carried at said projecting end for connection to the trailing vehicle; means interconnecting the sleeve and the drawbar to limit relative longitudinal slidable movement therebetween; said sleeve member, said drawbar and said rigidly secured mounting means each having respective apertures therein, the apertures being alignable only upon a predetermined relative position of the sleeve member, the drawbar and the mounting means; pin means carried on said opposite end of the sleeve member and receivable within said apertures upon movement of the sleeve member and the drawbar to said predetermined relative position; and biasing means urging the pin toward a position received in said apertures.

References Cited in the file of this patent

UNITED STATES PATENTS

| | | |
|---|---|---|
| 2,357,540 | Palmer | Sept. 5, 1944 |
| 2,446,223 | Forney | Aug. 3, 1948 |
| 2,988,383 | Carson | June 13, 1961 |